(No Model.)
F. J. PATTEN.
METHOD OF SYNCHRONIZING ELECTRIC MOTORS.
No. 392,930. Patented Nov. 13, 1888.
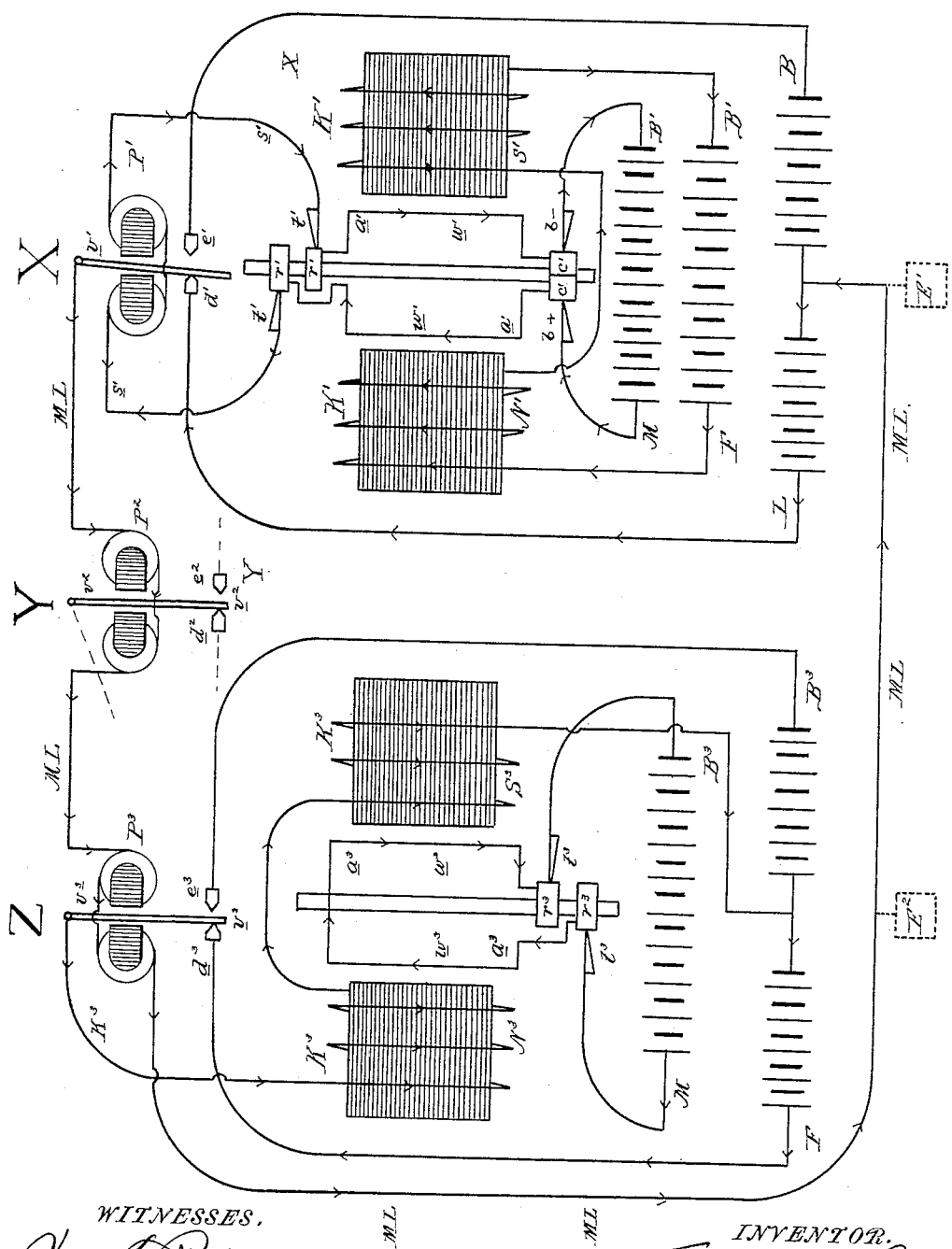
WITNESSES.
INVENTOR.

UNITED STATES PATENT OFFICE.

FRANCIS JARVIS PATTEN, OF NEW YORK, N. Y.

METHOD OF SYNCHRONIZING ELECTRIC MOTORS.

SPECIFICATION forming part of Letters Patent No. 392,930, dated November 13, 1888.

Application filed October 16, 1888. Serial No. 288,293. (No model.)

*To all whom it may concern:*

Be it known that I, FRANCIS JARVIS PATTEN, a citizen of the United States, residing at New York, in the county of New York and State of New York, have invented certain new and useful Improvements in Methods of Synchronizing Electric Motors; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

My invention relates to a mode of synchronizing electric motors, and has for its object the maintenance in synchronous motion of the rotating parts of two or more electric motors, said rotating parts being mechanically disconnected, the object of the invention being to maintain such synchronism, not only with respect to an entire revolution of the rotating part, but throughout the several stages of such revolution.

To these ends my invention consists in a method of establishing synchronous motion of the rotating parts of two or more electric motors by providing each of the motors with independent field-magnet and armature circuits and causing simultaneously in one of these independent circuits of each motor reversals of current, and in causing a direct current to flow through the other independent circuit of each of the motors.

My invention also consists in causing such reversals of current in one of the independent circuits above mentioned by periodical current changes in a controlling line-circuit connecting the stations at which the motors are located.

In another application filed by me, Serial No. 275,787, I have claimed the system of circuits and apparatus utilized in carrying out my invention. In my present application I claim a method by which the system is controlled.

It is the purpose of my invention to cause two or more electric motors of any size and power and located at different distant points to revolve in unison, or at a common rate of speed for all; also, to follow any change of speed to which a governing or controlling machine may be subject, and therefore produce uniform motion of all at either a constant or a variable speed. In the system here described the motors are all independent of each other, being each supplied by a separate local source of energy.

The figure shows by diagram the different motor circuits and connections in the system I have invented.

X Y Z are distant stations connected by the main-line circuit ML, which at station X is connected to the middle point of the split-line battery LB, whence it passes to all the distant stations, where the other motors are to be controlled, and returns to the armature of the polarized relay or vibrator at X. One of the motors—that shown in the figure at station X—is designated as the "governing motor," and all the others are caused to revolve in unison with it, and this machine is organized differently from the others, all of which are alike, one of them being shown in detail at station Z, the station Y representing any other intermediate station. It is therefore sufficient to explain the system to show the governing-machine and one of the governed motors with connecting-circuits. The governing-motor at X and its connection with the circuit will be first explained.

At station X is an ordinary direct-current electric motor of simple form. It has two field-magnets, N' S', the coils $k'$ $k'$ of which are energized by the independent source of energy FB'. This machine is provided with an ordinary shuttle-wound Siemens armature $a'$ $a'$, the coils of which, $w'$ $w'$, are connected to an ordinary two-part reversing-commutator, $c'$, upon which the two brushes $b+$ and $b-$ bear constantly. These brushes are connected in the circuit of an ordinary source of energy, MB', (designated as the motor-battery,) the function of which is to energize the armature and cause it to revolve. It is evident, however, that in the governing-machine at X both field and armature may be included in the same circuit. The armature $a'$ $a'$ differs somewhat from an ordinary closed-coil armature, for, besides the ordinary direct-current commutator, it has also two insulated ring-contacts, upon which the two rubbers $r'$ $r'$ bear, and the armature-coil is split in the middle and connected, one terminal to each of the ring-contacts $r'$ $r'$. The armature-coil would thus be an open one, and no current would flow through it. These rubbers $t'\ t'$ are connected by a closed external circuit, S S, which includes between its terminals $t'\ t'$ the coils of the polarized relay P', provided with the ordinary vibrating armature, $v'$, and double contact-stops $d'\ e'$. This external loop or single fixed coil of the revolving armature $a'\ a'$ constitutes an essential feature of my system, and the device itself, which I style an "electromotor" device, rests upon this feature of an external fixed loop or coil, which is so constructed as to form a part of the revolving-armature circuit, which thus remains permanently closed. As the armature revolves under the influence of the direct current from the source of energy MB', the armature-circuit $a'\ a'$ is traversed by rapidly-alternating currents through the reversing action of the commutator $c'$, which changes the direction of the current in the armature at each half-revolution thereof. The alternations of current in the armature $a'\ a'$ and in the external fixed loop, S' S', are therefore in unison with the half-revolutions of the armature $a'\ a'$ of the governing-motor at X. The polarized relay P' is therefore traversed by rapidly-alternating currents, and its armature $v'$ is kept in constant vibration by the revolving armature $a'\ a'$, making contact alternately at $d'$ and $e'$, and each vibration must correspond to a half-revolution of the governing-motor. The fixed extremity of the armature $v'$ is connected to the main-line circuit ML, and returns to the split-line battery LB, the poles of which are connected to the two stop-contacts $d'$ and $e'$.

At each one of the several distant stations Y and Z the main-line circuit includes the coils of a polarized relay or other vibrator, $P^2$ $P^3$, &c., similar to the one at station X. From the connection of the main-line circuit ML to the line-battery LB it results therefore that alternate impulses of current will be sent over the main line at each vibration of the armature of the polarized relay at the station X, and these pulsations of current sent alternately through the stop-contacts $d'$ and $e'$ from the opposed halves of the split battery LB will maintain all the armatures $v^2\ v^3$ of polarized relays in the main-line circuit in vibration and they will all necessarily vibrate in unison with the armature $v'$ at X and the half-revolutions of the motor-armature at that station. All the armatures of the different polarized relays will therefore beat the half-revolutions of the governing direct-current electric motor at the initial station X.

At the stations Y Z, &c., are placed electric motors of a different type, one of which (shown at Z) will suffice for a description of all. This motor (designated as a "driven" or "governed" machine) has no direct current-commutator. Its armature is a single closed-coil circuit having no external loop. Its terminals are connected to two ordinary insulated rings, $r^3\ r^3$, after the manner of an ordinary alternating-current armature; and against these rings two brushes, $t^3\ t^3$, are held in contact, which are connected to the poles of the battery $MB^3$ or other source of continuous direct current. The armature of the governed motor therefore receives constantly a current of one direction and has no reversing-commutator. The field-coils of this machine $k^3\ k^3$, which energize the field-magnets, are included in an alternating-current circuit, as follows: One terminal of the field-coils is connected to the middle of the split battery $FB^3$, whence it coils around the field-cores $N^3$ and $S^3$, and has its other terminal connected to the fixed extremity of the armature $v^3$ of the polarized relay at Z, the two contact-points $d^3$ and $e^3$ of which are connected to the opposite terminals of the split field-battery $FB^3$. From this system of local connections it results that at each vibration of the armature $v^3$ of the polarized relay $B^3$ at Z the field-coils of the motor at that station will have their polarity reversed, and as the armature-circuit $a^3\ a^3$ is traversed by a constant current of one direction it must of necessity make exactly one-half a revolution at each reversal of polarity of the field-magnets; but these reversals follow the alternating contacts of the armature $v^3$ as it vibrates back and forth, and touching alternately at $d^3$ and $e^3$ reverses the current in the field-coils of the motor at Z; but inasmuch as the vibrating armature $v^3$ moves in perfect unison with the vibrating armature $v'$ at station X it follows that since the latter moves once in response to each half-revolution of the motor at X the motor at the distant station Z, revolving in unison with the vibrator at that point, must move in perfect unison with the governing-motor at the station X. The half-revolutions of all the governed machines are therefore controlled by the successive half-revolutions of the governing-motor, whether they be slow or fast and regular or irregular. All the machines will therefore revolve in unison at either a constant or variable rate of speed of one of them.

It is evident that the main-line circuit ML may be either a complete metallic circuit, as shown, or it may be put to earth at $e'$ and $e^2$, and the polarized relays P' and $P^3$, &c., may be replaced by any form of vibrator, and the different sources of energy may be either dynamos or batteries, as shown.

While I have described and illustrated the use of reversed currents on the line and the production of said reversed currents by one of the motors of the system, I desire to have it understood that my invention is not restricted to so specific an application, as any change of current, either by interruption, reversal, or change of strength, which will produce simultaneously at the several stations the movement of a pole-changing device which will reverse the current in one of the independent circuits of the motor at said station would be within the scope of my invention. I have shown one of the motors as setting the pace of the others; but I desire to have it understood that all of the motors may be governed or controlled motors, it only being necessary that there shall be a circuit connecting the stations at which the motors are located, and that a current or currents thrown upon said circuit shall operate current-reversing devices at the stations. In such a case—that is, where all of the motors are controlled motors—the one shown at station X would be similar in structure and circuit arrangements to the one shown at Z. The periodicity of the waves thrown upon the line-circuit should always be of such character that the rotating parts of the several motors may have sufficient time to be fully influenced by the change of magnetism due to such waves.

Having thus described my invention, what I claim as new, and desire to secure by Letters Patent, is—

1. The method of producing or preserving synchronous motion of the moving parts of electric motors having independent field-magnets and armatures, which consists in maintaining a constant polarity in one set of like elements of all the motors, in including the other set of like elements in separate local circuits, and in causing simultaneous reversals of current in said circuits.

2. The method of producing or preserving synchronous motion of the moving parts of electric motors, which consists in exciting the field-magnets and armatures of the motors by separate circuits, maintaining a constant polarity in one set of like elements of all the motors, and in causing simultaneous reversals in the polarity of the other set of like parts of all the motors by producing suitable changes in a common controlling-circuit.

3. The method of producing or preserving synchronous motion of the moving parts of electric motors having independent field-magnet and armature circuits, which consists in causing direct currents to flow through the armature-coils of each motor, and in causing reversals of current to flow simultaneously through the field-magnet circuits of the several motors, said reversals being controlled, both in time and in duration, by a common controlling-circuit.

4. The method of producing or preserving synchronous motion of the moving parts of electric motors having independent field-magnet and armature circuits, which consists in causing a direct current to flow through the armature-circuit of each controlled motor, and causing reversed currents to flow simultaneously through the field-magnet circuits of the motors, the periodicity of the reversed currents being controlled by a line-current, in which current changes are produced by the operation of a common controlling-motor.

In testimony whereof I affix my signature in presence of two witnesses.

FRANCIS JARVIS PATTEN.

Witnesses:
  AUGUSTUS MERRITT,
  WM. J. BLAKE.